United States Patent
Lee et al.

(10) Patent No.: US 11,740,462 B2
(45) Date of Patent: Aug. 29, 2023

(54) HOLOGRAPHIC HEAD-UP DISPLAY DEVICE

(71) Applicant: Samsung Display Co., Ltd., Yongin-Si (KR)

(72) Inventors: Hye Sog Lee, Osan-si (KR); Byung Choon Yang, Seoul (KR); Jae Ho You, Gwangmyeong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/986,219

(22) Filed: Aug. 5, 2020

(65) Prior Publication Data

US 2020/0363642 A1    Nov. 19, 2020

Related U.S. Application Data

(62) Division of application No. 15/861,525, filed on Jan. 3, 2018, now Pat. No. 10,768,424.

(30) Foreign Application Priority Data

Jul. 5, 2017   (KR) ........................ 10-2017-0085608

(51) Int. Cl.
*G02B 27/01*   (2006.01)
*G02B 27/09*   (2006.01)
(Continued)

(52) U.S. Cl.
CPC ..... *G02B 27/0172* (2013.01); *G02B 27/0101* (2013.01); *G02B 27/0103* (2013.01);
(Continued)

(58) Field of Classification Search
CPC ........ G02B 27/0172; G02B 2027/0105; G02B 2027/0107; G02B 2027/0109;
(Continued)

(56) References Cited

U.S. PATENT DOCUMENTS 5,090,795 A    2/1992 O'Meara et al.
5,729,242 A *  3/1998 Margerum ......... G02B 27/0101
                                                    349/5
(Continued)

FOREIGN PATENT DOCUMENTS

JP       2015-524944 A    8/2015
KR    10-1999-0038918 A    6/1999
(Continued)

OTHER PUBLICATIONS

Christmas, Jamieson & Masiyano, Dackson & Collings, N . . . (2015). Holographic Automotive Head Up Displays. 10.13140/RG.2.1.4542.9607 (Year: 2015).

*Primary Examiner* — Zachary W Wilkes
(74) *Attorney, Agent, or Firm* — Innovation Counsel LLP

(57) ABSTRACT

A holographic head-up display device includes: a light source portion that emits coherent light; an optical modulation portion that modulates the coherent light; a relay optical system that focuses the modulated light; a filter mirror that includes a reflection area disposed at a focal position of the relay optical system and reflecting light incident through the relay optical system and an absorption area disposed at the periphery of the reflection area and absorbing light incident through the relay optical system; and a transflective mirror that partially transmits and partially reflects light reflected by the filter mirror.

7 Claims, 10 Drawing Sheets

(51) Int. Cl.
*G03H 1/10* (2006.01)
*G03H 1/22* (2006.01)

(52) U.S. Cl.
CPC ..... *G02B 27/0916* (2013.01); *G02B 27/0977* (2013.01); *G03H 1/10* (2013.01); *G03H 1/2205* (2013.01); *G03H 1/2294* (2013.01); G02B 2027/0174 (2013.01); G03H 2001/221 (2013.01); G03H 2001/2207 (2013.01); G03H 2001/2284 (2013.01); G03H 2223/54 (2013.01); G03H 2223/55 (2013.01)

(58) Field of Classification Search
CPC ........ G02B 2027/0174; G02B 27/0916; G02B 27/0977; G03H 1/2205; G03H 1/2294
USPC .......................................... 359/630
See application file for complete search history.

(56) References Cited

U.S. PATENT DOCUMENTS

| | | | |
|---|---|---|---|
| 5,812,100 A | 9/1998 | Kuba | |
| 6,043,937 A | 3/2000 | Hudson et al. | |
| 6,331,909 B1* | 12/2001 | Dunfield | G02B 26/0841 359/199.1 |
| 6,731,435 B1* | 5/2004 | Kormos | G02B 26/0816 345/7 |
| 7,268,929 B2* | 9/2007 | Asai | G02B 26/0833 359/212.1 |
| 7,835,050 B2 | 11/2010 | Tanijiri et al. | |
| 8,928,983 B2 | 1/2015 | Horiuchi et al. | |
| 9,766,456 B2* | 9/2017 | Christmas | G02B 27/0103 |
| 10,261,314 B2 | 4/2019 | Zhao et al. | |
| 10,585,396 B2 | 3/2020 | Christmas et al. | |
| 2009/0322972 A1* | 12/2009 | Ando | G02B 27/0172 349/11 |
| 2016/0025973 A1 | 1/2016 | Guttag et al. | |
| 2019/0107714 A1* | 4/2019 | Ishihara | H04N 9/3129 |

FOREIGN PATENT DOCUMENTS

| | | |
|---|---|---|
| KR | 10-0297794 B1 | 11/2001 |
| KR | 10-2011-0016118 A | 2/2011 |
| KR | 10-0206688 B1 | 2/2011 |
| KR | 10-1591904 B1 | 2/2016 |
| KR | 10-2017-0034792 A | 3/2017 |

\* cited by examiner

HOLOGRAPHIC HEAD-UP DISPLAY DEVICE

CROSS-REFERENCE TO RELATED APPLICATION

This application is a divisional application of U.S. patent application Ser. No. 15/861,525 filed on Jan. 3, 2018, which claims priority under 35 USC § 119 to Korean Patent Application No. 10-2017-0085608 filed in the Korean Intellectual Property Office on Jul. 5, 2017, the entire contents of which are incorporated herein by reference.

BACKGROUND

(a) Field

Embodiments of the present inventive concept relates to a holographic display device. More particularly, the present inventive concept relates to a holographic head-up display device that can be provided in a plane or a vehicle.

(b) Description of the Related Art

A technology that records interference patterns containing information of a 3D image in a media such as a film or an electronic device or a technology that generates a 3D image through such a film or electronic device is called holography, and a 3D image realized through the holography is called a hologram.

Recently, a holographic head-up device that enable the surrounding scene and image information to be simultaneously seen in a plane or a vehicle using a holography technology has been researched and developed. Such a holographic head-up display device displays a 3D image by using diffraction and interference of light, and the diffraction of light may cause unnecessary diffraction noise. The diffraction noise is generated due to characteristics of light, and since physical characteristics of light cannot be changed, the holographic head-up display device needs a structural configuration to remove the diffraction noise.

The above information disclosed in this Background section is only for enhancement of understanding of the background of the present inventive concept and therefore it may contain information that does not form the prior art that is already known in this country to a person of ordinary skill in the art.

SUMMARY

An image to be displayed may appear blurred or diffused due to the diffraction noise. Further, an unnecessary dummy image may be disposed in a portion other than portions where an image is to be displayed. The diffraction noise and the dummy image may cause deterioration of display quality of the holographic head-up display device.

The present inventive concept has been made in an effort to provide a holographic head-up display device that can remove diffraction noise and a dummy image that may occur in the holographic head-up display device.

A holographic head-up display device according to an exemplary embodiment of the present inventive concept includes: a light source portion configured to emit light, the light being coherent light; an optical modulation portion configured to modulate the light; a relay optical system configured to focus the light; a filter mirror that includes a reflection area disposed at a focal position of the relay optical system and configured to reflect light incident through the relay optical system and an absorption area disposed at a periphery of the reflection area and configured to absorb light incident through the relay optical system; and a transflective mirror configured to partially transmit and partially reflect light reflected by the filter mirror.

A size of the reflection area may be the same as a size of a focal image formed at a focus point of the relay optical system.

The size of the focal image may be inversely proportional to magnification of the relay optical system.

A shape of the reflection area may be the same as that of the focal image.

The shape of the focal image may be the same as that of a display area to which the optical modulation portion is configured to emit light.

The shape of the display area of the optical modulation portion and a shape of the reflection area may be a quadrangle.

The filter mirror may have a flat planar shape.

The filter mirror may have a curved shape that is bent with reference to a virtual central axis in one direction, and the reflection area may be configured to provide a convex reflective side with respect to light incident from the optical modulation portion.

The filter mirror may be configured to have a convex hemispherical shape with respect to light incident from the optical modulation portion, and the reflection area may be configured to provide a convex hemispherical reflective side with respect to light incident from the optical modulation portion.

A holographic head-up display device according to another exemplary embodiment of the present inventive concept includes: a light source portion configured to emit light, the light being coherent light; an optical modulation portion that configured to modulate the light; a relay optical system configured to focus the light; a reflection mirror that is disposed at a focal position of the relay optical system and configured to reflect light incident through the relay optical system; a light absorption plate that is disposed at a rear side of the reflection mirror and configured to absorb light incident through the relay optical system; and a transflective mirror configured to partially transmit and partially reflect light reflected by the reflection mirror.

A size of a reflective side of the reflection mirror may be the same as a size of a focal image formed at a focus point of the relay optical system.

A shape of the reflective side of the reflection mirror may be the same as a shape of the focal image, and the shape of the focal image may be the same as a shape of a display area to which the optical modulation portion emits light.

The shape of the display area of the optical modulation portion and the shape of the reflective side of the reflection mirror may be a quadrangle.

The reflection mirror may be configured to provide a convex reflective side that is bent with reference to a virtual central axis in one direction with respect to light incident from the optical modulation portion.

The reflection mirror may be configured to provide a convex hemispherical reflective side with respect to light incident from the optical modulation portion.

A holographic head-up display device according to still another exemplary embodiment of the present inventive concept includes: a relay optical system configured to focus incident light on a focus point; and a filter mirror that includes a reflection portion configured to reflect a focal image formed at the focus point and an absorption portion configured to absorb diffraction noise formed at a periphery of the focal image.

The reflection portion and the absorption portion may be disposed on the same plane of the filter mirror.

The filter mirror may be configured to have a convex curved shape with respect to the focused light.

The reflection portion and the absorption portion may be disposed on different planes of the filter mirror.

The reflection portion may be configured to have a convex curved shape with respect to the focused light, and the absorption portion may have a flat planar shape.

The holographic head-up display device according to the exemplary embodiment can remove diffraction noise and a dummy image that may occur in the holographic head-up display device so that display quality of an image can be improved.

DETAILED DESCRIPTION

Figure 1:
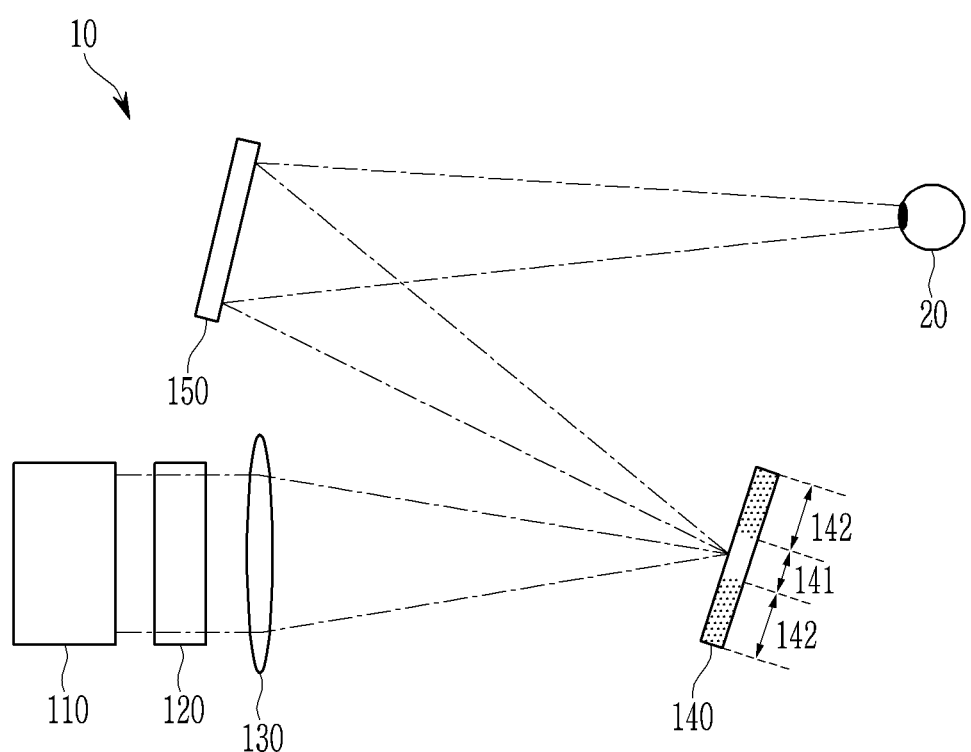
FIG. 1 is a schematic block diagram of a holographic head-up display device according to an exemplary embodiment of the present inventive concept.

Hereinafter, exemplary embodiments of the present inventive concept will be described in more detail with reference to the accompanying drawings. As those skilled in the art would realize, the described embodiments may be modified in various different ways, all without departing from the spirit or scope of the present inventive concept.

The drawings and description are to be regarded as illustrative in nature and not restrictive. Like reference numerals designate like elements throughout the specification.

In addition, the size and thickness of each configuration shown in the drawings are arbitrarily shown for better understanding and ease of description, but the present inventive concept is not limited thereto. In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

In this specification, the phrase "on a plane" means viewing a target portion from the top, and the phrase "on a cross-section" means viewing a cross-section formed by vertically cutting a target portion from the side.

Hereinafter, referring to FIG. 1 and FIG. 2, a holographic display device according to an exemplary embodiment of the present inventive concept will be described.

FIG. 1 is a schematic block diagram of a holographic head-up display device according to an exemplary embodiment of the present inventive concept. FIG. 2 shows a filter mirror according to the exemplary embodiment of the present inventive concept.

Figure 2:
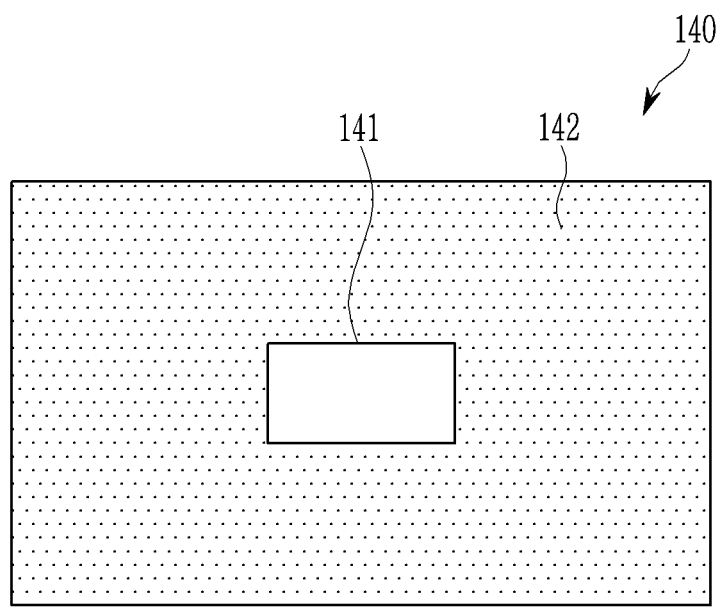
FIG. 2 shows a filter mirror according to the exemplary embodiment of the present inventive concept.
Figure 2:
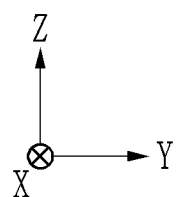

Referring to FIG. 1 and FIG. 2, a holographic head-up display device 10 includes a light source portion 110, an optical modulation portion 120, a relay optical system 130, a filter mirror 140, and a transflective mirror 150.

The light source portion 110 emits coherent light having a constant wavelength and continuous phase to the optical modulation portion 120. The light source portion 110 may be provided to enable light of a surface light source to be incident on the optical modulation portion 120. For example, the light source portion 110 may include at least one light source (not shown) emitting coherent light and a collimator lens that converts light from the light source as a collimated beam or an optical condenser (not shown). In this case, at least one of a He—Ne laser, an Ar laser, a semiconductor laser, a laser diode, and the like, which have good coherence, may be used as the light source. Alternatively, as the light source, a light emitting diode (LED) may be used, and when the light emitting diode emits incoherent light, the emitted light may become coherent light by being passed through a pin hole being a minute hole. Alternatively, in an exemplary embodiment, the light source portion 110 may emit light of a surface light source by using a holographic optical element (HOE) that can change a path of incident light for the light to be emitted with a specific refraction angle with respect to a specific incident angle of the light. The light source portion 110 may have any structure in which coherent light of a surface light source can be emitted to the optical modulation portion 120, and thus there is no limit in structure of the light source portion 110.

The optical modulation portion 120 implements a 3D image by modulating light incident from the light source portion 110. That is, the optical modulation portion 120 diffracts the coherent light, and thus beams meeting on a specific space interfere with each other such that the 3D image can be realized. The optical modulation portion 120 may be a holographic display that is driven in an analog or digital method. For example, the optical modulation portion 120 may include a liquid crystal display (LCD), a liquid crystal on silicon (LCoS) display, a digital micro-mirror device (DMD), and the like. Alternatively, in an exemplary embodiment, the optical modulation portion 120 may be provided as a plate or a film where 3D image information is recorded.

Hereinafter, the optical modulation portion 120 will be exemplarily described as a holographic display. The optical modulation portion 120 records interference patterns formed through mathematically calculating and processing an image to be realized as data, and may display the interference pattern based on the recorded data. Light incident on the optical modulation portion 120 is diffracted by the interference patterns and intensity of the light may be changed while passing through the optical modulation portion 120. The optical modulation portion 120 emits the light diffracted by the interference patterns to the relay optical system 130.

The relay optical system 130 transmits light modulated by the optical modulation portion 120 to the filter mirror 140. The relay optical system 130 may serve to focus the light emitted from the optical modulation portion 120 to a desired location of the filter mirror 140. The relay optical system 130 may be provided as a special sphere or nonspherical lens. In FIG. 1, the relay optical system 130 includes one lens, but the relay optical system 130 may include a plurality of optical elements such as a convex lens, a concave lens, a mirror, and the like depending on exemplary embodiments.

The filter mirror 140 includes a reflection area 141 and an absorption area 142. The reflection area 141 is an area that reflects light incident through the relay optical system 130 to the transflective mirror 150, and the absorption area 142 is an area that absorbs light incident through the relay optical system 130. The reflection area 141 may be disposed substantially at a center of the filter mirror 140, and the absorption area 142 may be disposed at the periphery of the reflection area 141. The reflection area 141 and the absorption area 142 may be disposed on the same plane. The relay optical system 130 may focus the light emitted from the optical modulation portion 120 on the reflection area 141 of the filter mirror 140, and the reflection area 141 may be disposed at a focal position of the relay optical system 130. A size of the reflection area 141 may be substantially the same as that of a focal image formed at the focus point of the relay optical system 130. The focal image implies an image formed by light that matches the focal point of the relay optical system 130. The size of the focal image may be inversely proportional to the magnification of the relay optical system 130. That is, the size of the reflection area 141 may be inversely proportional to the magnification of the relay optical system 130. The shape of the reflection area 141 may be substantially the same as that of the focal image. The shape of the focal image may be the same as a shape of a display area (e.g., an area emitting light). That is, the shape of the reflection area 141 may be the same as the shape of the display area of the optical modulation portion 120. For example, when the shape of the display area of the optical modulation portion 120 is a quadrangle, the shape of the focal image may be a quadrangle and the shape of the reflection area 141 may be a quadrangle.

Meanwhile, diffraction noise and dummy images may be iteratively formed at the periphery of the focal image due to aberration of the relay optical system 130 and diffraction of light. Since the size and the shape of the reflection area 141 are the same as those of the focal image, the diffraction image and the dummy image are formed in the absorption area 142 of the filter mirror 140. Accordingly, the diffraction noise and the dummy image are absorbed by the absorption area 142 and thus they are not reflected to the transflective mirror 150. That is, the filter mirror 140 may filter unnecessary diffraction noise and the dummy image other than the focal image. That is, the filter mirror 140 may serve as a spatial filter and a reflection mirror.

As a curved mirror with focus, the transflective mirror 150 partially transmits and partially reflects light reflected by the filter mirror 140 so as to collect the light to the eyes of a user 20. The user 20 may recognize a holographic image realized by the optical modulation portion 120 as a virtual image located at an infinite or controllable distance. Meanwhile, the transflective mirror 150 may include a holographic optical element that can change a path of incident light so that the light can be emitted to the eyes of the user 20 with a specific angle with respect to a specific incident angle of the reflected light.

Hereinafter, various exemplary embodiments of the filter mirror 140 that can be used in the holographic head-up display device 10 of FIG. 1 will be described. A direction in which the light proceeds toward the filter mirror 140 from the optical modulation portion 120 will be referred to as a first direction X, and a direction that is parallel with a plane of the filter mirror 140, on which the light is incident, and perpendicular to the first direction X, will be referred to as a second direction Y. The second direction Y may be a horizontal direction or a left and right direction of the filter mirror 140 as shown in FIG. 2. In addition, a direction that is perpendicular to the first direction X and the second direction Y will be referred to as a third direction Z. As shown in FIG. 2, the third direction Z may be a vertical direction or a top and bottom direction of the filter mirror 140.

In the holographic head-up display device 10, the filter mirror 140 may be inclined at a predetermined angle with respect to at least one of the first direction X, the second direction Y, and the third direction Z so as to reflect incident light to the transflective mirror 150 (as exemplarily shown in FIG. 1, the filter mirror 140 is inclined at a predetermined angle with respect to the third direction Z). However, in the following description of exemplary embodiments of the filter mirror 140, the filter mirror 140 will be described to be disposed on a plane that is perpendicular to the first direction X regardless of inclination of the filter mirror 140.

Referring to FIG. 2, when the filter mirror 140 is viewed from the first direction X, the filter mirror 140 may have a flat planar shape where the quadrangular-shaped reflection area 141 and the absorption area 142 disposed at the periphery of the reflection area 141 are formed. In FIG. 2, the shape of the reflection area 141 is a quadrangle corresponding to the shape of the display area of the optical modulation portion 120. When the shape of the display area of the optical modulation portion 120 is a circle or a polygon, the shape of the reflection area 141 may be a circle or a polygon corresponding to the shape of the display area of the optical modulation portion 120. Further, the absorption area 142 may have a size that can absorb unnecessary diffraction noise, dummy images, and the like other than the focal image.

Figure 3:
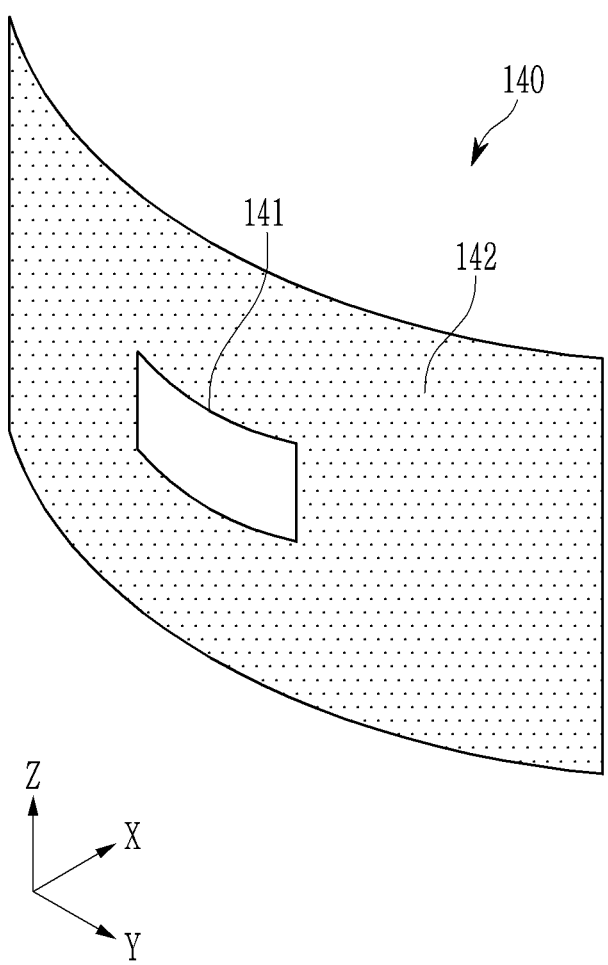
FIG. 3 shows a filter mirror according to another exemplary embodiment of the present inventive concept.

Next, referring to FIG. 3, a filter mirror 140 according to another exemplary embodiment will be described. FIG. 3 shows a filter mirror according to another exemplary embodiment of the present inventive concept.

Referring to FIG. 3, a filter mirror 140 includes a reflection area 141 and an absorption area 142, and may have a shape that is bent with reference to a virtual central axis in the third direction Z. Accordingly, the reflection area 141 can provide a reflective side that is convex with reference to the virtual central axis in the third direction Z with respect to light incident from the optical modulation portion 120.

Compared to the filter mirror 140 of FIG. 2, the reflection area 141 of the exemplary of FIG. 3 can reflect light expanded in the second direction Y to the transflective mirror 150. That is, light expanded further to the left and right direction of the transflective mirror 150 may be incident on the transflective mirror 150, and accordingly, the user 20 can view a virtual image expanded to the left and right sides. That is, a field of view of the holographic head-up display device 10 can be further widened to the left and right direction.

Figure 4:
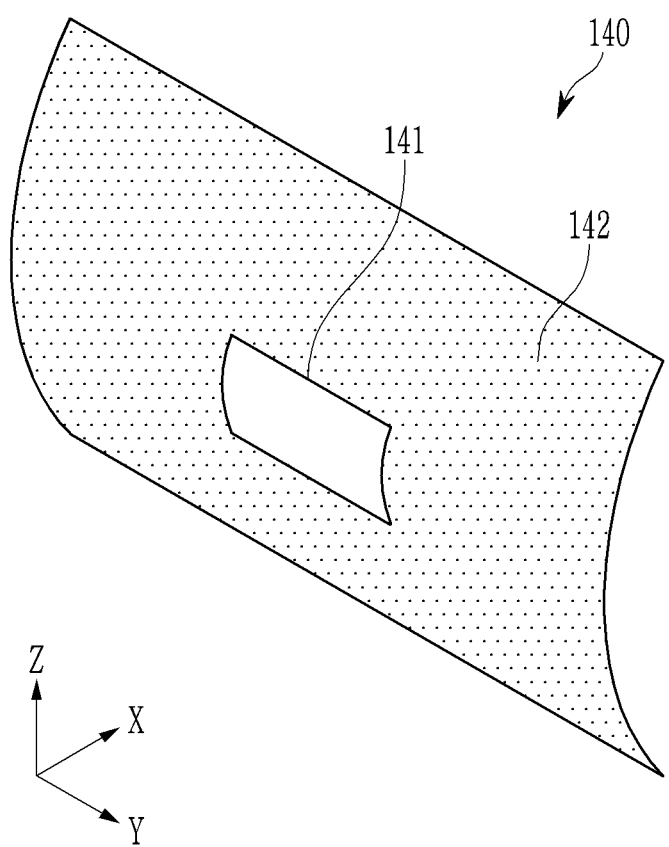
FIG. 4 shows a filter mirror according to still another exemplary embodiment of the present inventive concept.

Next, referring to FIG. 4, a filter mirror 140 according to another exemplary embodiment will be described. FIG. 4 shows a filter mirror according to another exemplary embodiment of the present inventive concept.

Referring to FIG. 4, a filter mirror 140 includes a reflection area 141 and an absorption area 142, and may have a shape that is bent with reference to a virtual central axis in the second direction Y. Accordingly, the reflection area 141 provides a reflective side that is convex with respect to the virtual central axis in the second direction Y with respect to light incident from the optical modulation portion 120.

Compared to the filter mirror 140 of FIG. 2, the reflection area 141 of the exemplary of FIG. 3 can reflect light expanded in the third direction Z to the transflective mirror 150. That is, light expanded further to the top and bottom direction of the transflective mirror 150 may be incident on the transflective mirror 150, and accordingly, the user 20 can view a virtual image expanded to the top and bottom sides. That is, a field of view of the holographic head-up display device 10 can be further widened vertically.

Figure 5:
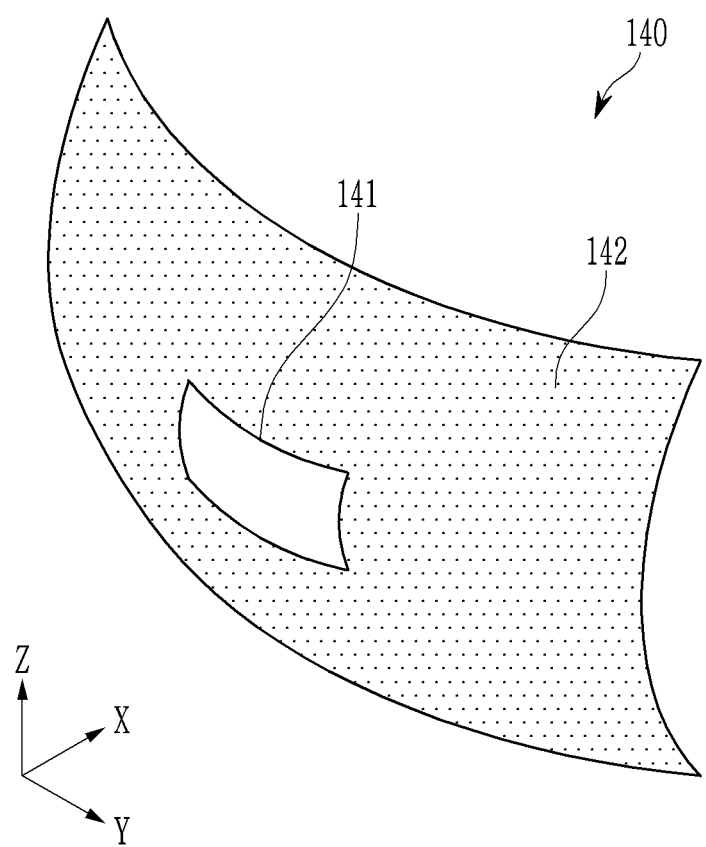
FIG. 5 shows a filter mirror according to still another exemplary embodiment of the present inventive concept.

Next, referring to FIG. 5, a filter mirror 140 according to another exemplary embodiment will be described. FIG. 5 shows a filter mirror according to another exemplary embodiment of the present inventive concept.

Referring to FIG. 5, a filter mirror 140 includes a reflection area 141 and an absorption area 142, and may have a hemispherical shape that is convex with respect to light incident from the optical modulation portion 120. Accordingly, the reflection area 141 may provide a hemispherical reflective side that is convex with respect to the light incident from the optical modulation portion 120.

Compared to the filter mirror 140 of FIG. 2, the reflection area 141 of the exemplary of FIG. 5 can reflect light expanded in the second direction Y and the third direction Z to the transflective mirror 150. That is, light expanded further to the horizontal direction and the vertical direction of the transflective mirror 150 may be incident on the transflective mirror 150, and accordingly, the user 20 can view a virtual image expanded to the vertical and horizontal directions. That is, a field of view of the holographic head-up display device 10 can be further widened vertically and horizontally.

Hereinafter, referring to FIG. 6 and FIG. 7, a holographic head-up display device 10 according to another exemplary embodiment will be described. Only differences with the above-described holographic head-up display device of FIG. 1 and FIG. 2 will be mainly described.

Figure 6:
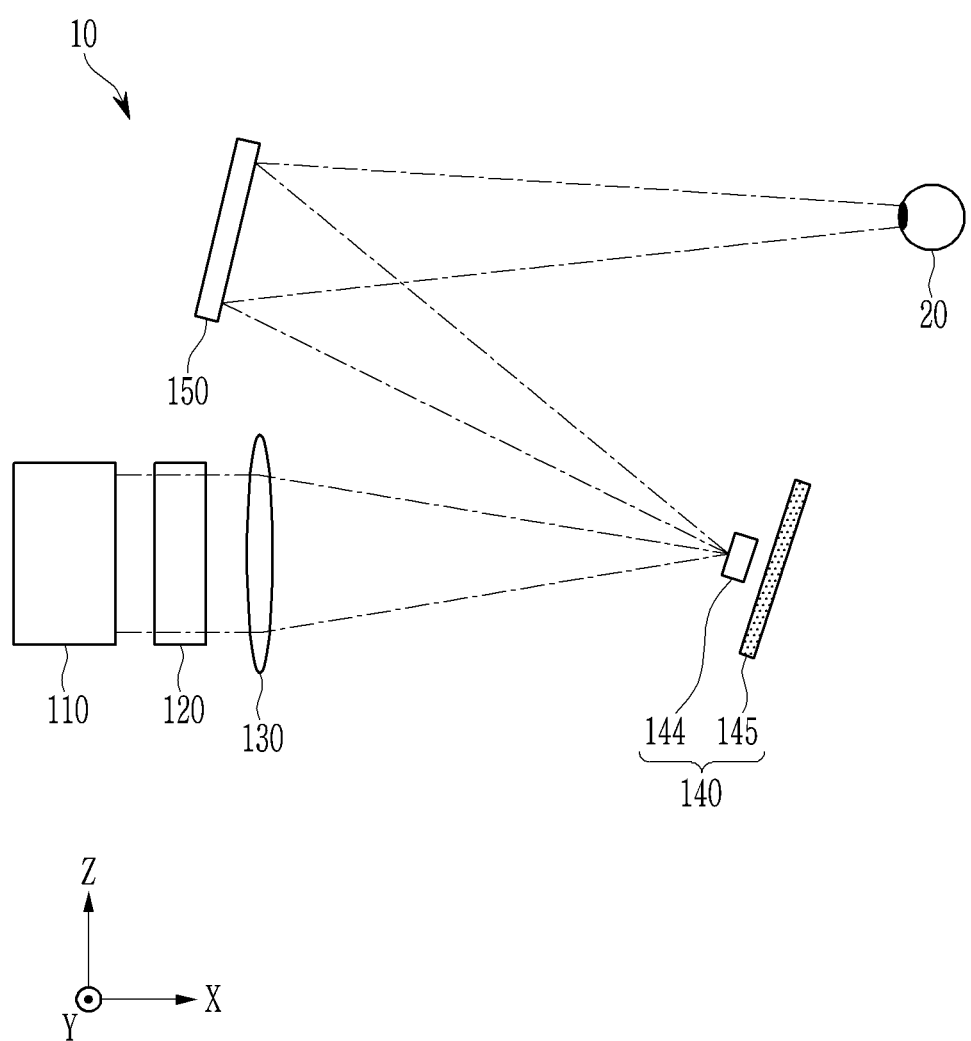
FIG. 6 is a schematic block diagram of a holographic head-up display device according to another exemplary embodiment of the present inventive concept.

FIG. 6 is a schematic block diagram of a holographic head-up display device according to another exemplary embodiment of the present inventive concept. FIG. 7 shows a filter mirror according to the other exemplary embodiment of the present inventive concept.

Figure 7:
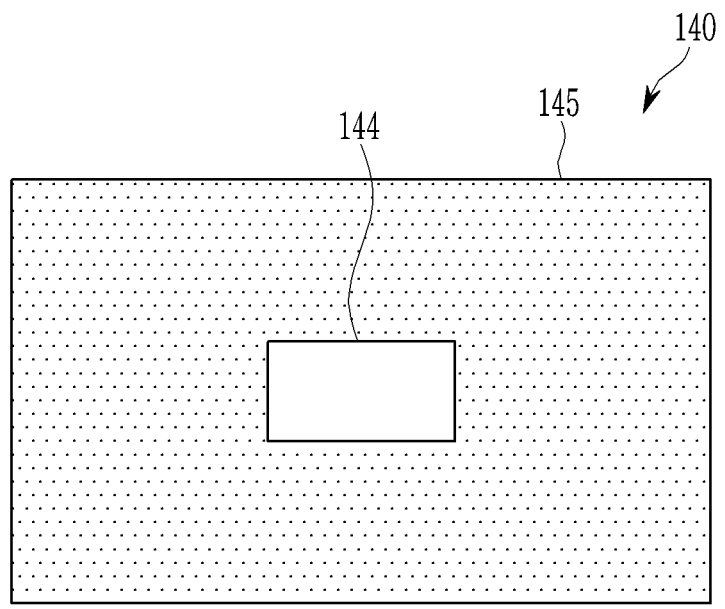
FIG. 7 shows a filter mirror according to still another exemplary embodiment of the present inventive concept.
Figure 7:
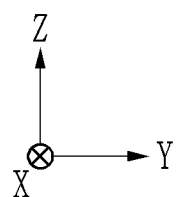

Referring to FIG. 6 and FIG. 7, a filter mirror 140 includes a reflection mirror 144 and a light absorption plate 145.

The reflection mirror 144 reflects light incident through a relay optical system 130 to a transflective mirror 150. The light absorption plate 145 is disposed at a rear side of the reflection mirror 144 while overlapping the reflection mirror 144, and absorbs light incident through the relay optical system 130. That is, the reflection mirror 144 and the light absorption plate 145 are disposed on different planes.

The relay optical system 130 may focus light emitted from an optical modulation portion 120 to the reflection mirror 144 of the filter mirror 140, and the reflection mirror 144 may be disposed on a focal position of the relay optical system 130. A size of a reflective side of the reflection mirror 144 may be substantially the same as a size of a focal image formed at a focal point of the relay optical system 130. The size of the reflective side of the reflection mirror 144 may be inversely proportional to magnification of the relay optical system 130. A shape of the reflective side of the reflection mirror 144 may be substantially the same as a shape of the focal image. That is, the shape of the reflective side of the reflection mirror 144 may be the same as a shape of a display area of the optical modulation portion 120.

As the size and the shape of the reflective side of the reflection mirror 144 are the same as those of the focal image, diffraction images and dummy images formed at the periphery of the focal image are passed through the periphery of the reflection mirror 144 and thus formed in the light absorption plate 145. Accordingly, the diffraction noise and the dummy image are absorbed by the light absorption plate 145 and thus they are not reflected to the transflective mirror 150. That is, the filter mirror 140 may filter unnecessary diffraction noise and dummy images other than the focal image.

The transflective mirror 150 partially transmits and partially reflects light reflected by the reflection mirror 144 to collect the light to the eyes of a user 20.

As shown in FIG. 7, when the filter mirror 140 is viewed in a first direction X, each of the reflection mirror 144 and the light absorption plate 145 may substantially have a flat planar shape, and the reflection mirror 144 and the light absorption plate 145 may overlap each other at about a center portion of the light absorption plate 145.

In FIG. 7, the shape of the reflective side of the reflection mirror 144 is a quadrangle corresponding to the shape of the display area of the optical modulation portion 120. Alternatively, the shape of the reflective side of the reflection mirror 144 may be a circle or a polygon corresponding to the shape of the display area of the optical modulation portion 120. Further, the light absorption plate 145 may have a size that is appropriate for absorption of unnecessary diffraction noise or a dummy image other than the focal image, and there is no limit in size or shape of the light absorption plate 145.

Except for such a difference, the features of the exemplary embodiment of FIG. 1 and FIG. 2 can be entirely applied to the exemplary embodiment of FIG. 6 and FIG. 7, and therefore a description of the features of the above-described exemplary embodiment of FIG. 1 and FIG. 2 will be omitted.

Hereinafter, other exemplary embodiments of the filter mirror 140 that can be used in the holographic head-up display device 10 of FIG. 6 will be described with reference to FIG. 8 to FIG. 10.

Figure 8:
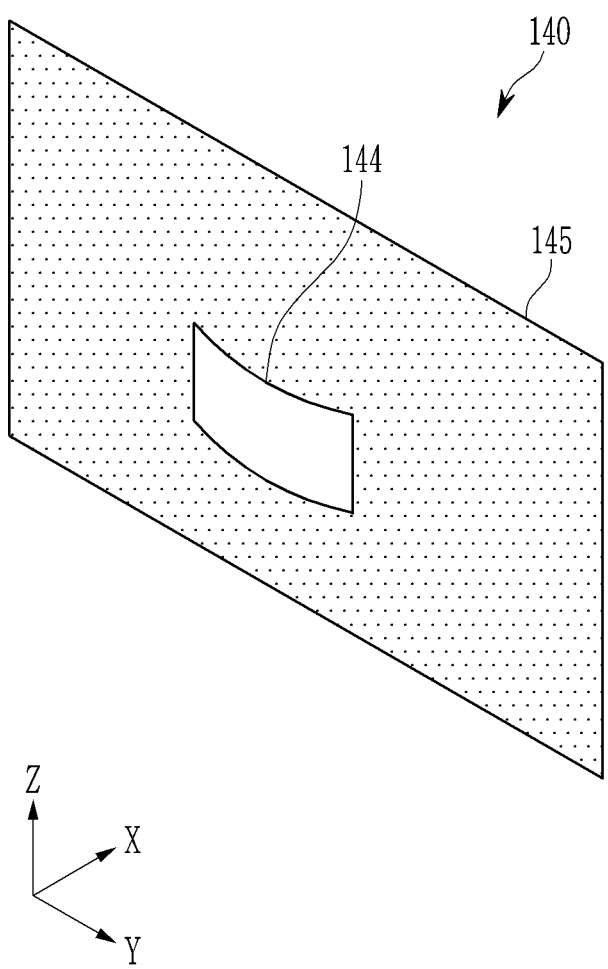
FIG. 8 shows a filter mirror according to still another exemplary embodiment of the present inventive concept.

FIG. 8 shows a filter mirror according to another exemplary embodiment of the present inventive concept.

Referring to FIG. 8, a reflection mirror 144 may have a curved shape that is bent with reference to a virtual central axis in a third direction Z. That is, the reflection mirror 144 can provide a convex reflective side that is bent with reference to the virtual central axis in the third direction Z with respect to light incident from the optical modulation portion 120. In this case, the light absorption plate 145 may have a flat planar shape. Compared with the filter mirror 140 illustrated in FIG. 7, the reflection mirror 144 of the embodiment of FIG. 8 can reflect light that extends in the second direction Y to the transflective mirror 150. That is, light further expanded in the left and right direction of the transflective mirror 150 may be incident on the transflective mirror 150, and accordingly, the user 20 can view a virtual image that is expanded in the left and right direction. That is, a field of view of the holographic head-up display device 10 can be further widened in the left and right direction.

Figure 9:
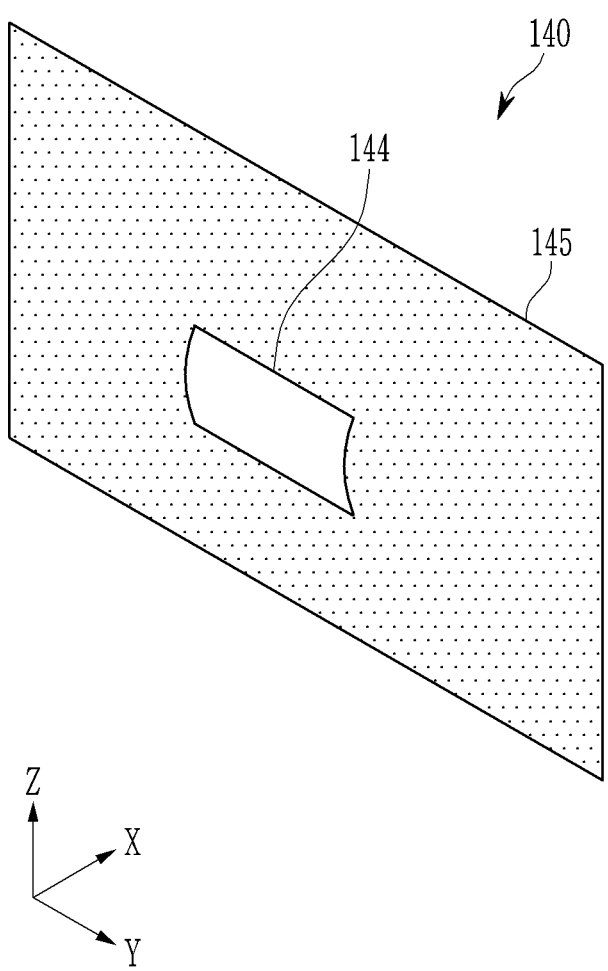
FIG. 9 shows a filter mirror according to still another exemplary embodiment of the present inventive concept.

FIG. 9 shows a filter mirror according to another exemplary embodiment of the present inventive concept.

Referring to FIG. 9, a reflection mirror 144 may have a curved shape that is bent with reference to a virtual central axis in a second direction Y. That is, the reflection mirror 144 can provide a convex reflective side that is bent with reference to the virtual central axis in the second direction Y with respect to light incident from the optical modulation portion 120. In this case, the light absorption plate 145 may have a flat planar shape.

Compared to the filter mirror 140 of FIG. 7, a reflection mirror 144 of an exemplary embodiment of FIG. 9 may reflect light expanded in the third direction Z to the transflective mirror 150. That is, light further expanded in the top and bottom direction of the transflective mirror 150 may be incident on the transflective mirror 150, and accordingly, the user 20 can view a virtual image that is expanded in the top and bottom direction. That is, a field of view of the holographic head-up display device 10 can be further widened in the top and bottom direction.

Figure 10:
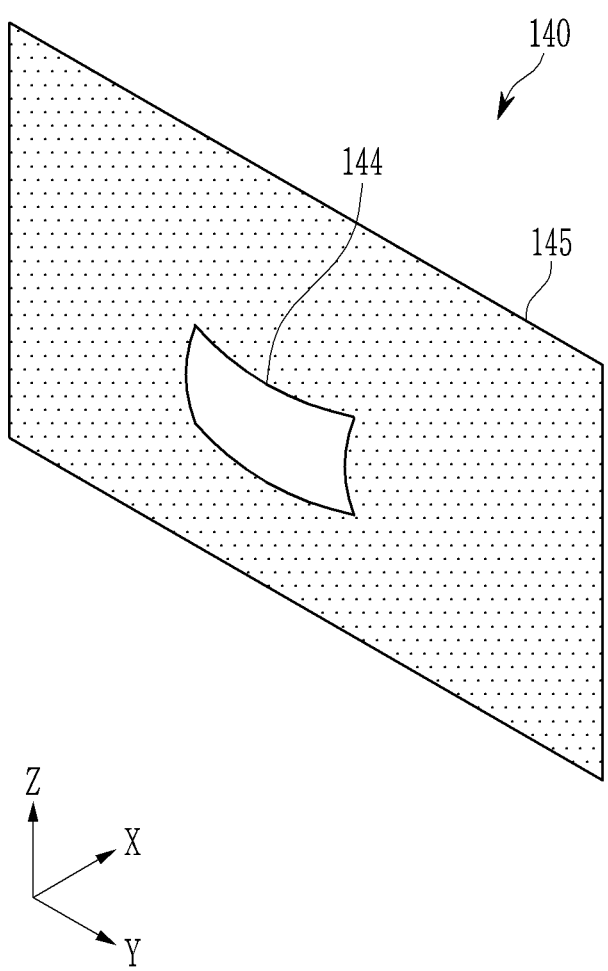
FIG. 10 shows a filter mirror according to still another exemplary embodiment of the present inventive concept.

FIG. 10 shows a filter mirror according to still another exemplary embodiment of the present inventive concept.

Referring to FIG. 10, a reflection mirror 144 may have a convex hemispherical shape with respect to light incident from the optical modulation portion 120. Accordingly, the reflection mirror 144 can provide a hemispherically convex reflective side with respect to light incident from the optical modulation portion 120. In this case, the light absorption plate 145 may have a flat planar shape.

Compared to the filter mirror 140 of FIG. 7, a reflection mirror 144 of an exemplary embodiment of FIG. 10 may reflect light expanded in the second direction Y and the third direction Z to the transflective mirror 150. That is, light further expanded in the vertical and horizontal directions of the transflective mirror 150 may be incident on the transflective mirror 150, and accordingly, the user 20 can view a vertically and horizontally expanded virtual image. That is, a field of view of the holographic head-up display device 10 can be further expanded in the horizontal and vertical directions.

As described above, the holographic head-up display device 10 according to the above-described exemplary embodiments of the present inventive concept can remove diffraction noises and dummy images by using the filter mirror 140 including the reflection area 141 or the reflection mirror 144 of which the size and the shape are the same as those of a focal image formed at a focus point of the relay optical system 130, and accordingly, a more clear image can be provided.

While the present inventive concept has been described in connection with what is presently considered to be practical example embodiments, it is to be understood that the the present inventive concept is not limited to the disclosed embodiments, but, on the contrary, is intended to cover various modifications and equivalent arrangements included within the spirit and scope of the appended claims. It will be understood by those skilled in the art that various changes in form and detail may be made without departing from the scope of the present inventive concept. Accordingly, the true scope of the present inventive concept should be determined by the technical idea of the appended claims.

What is claimed is:

1. A holographic head-up display device comprising:
   a light source portion configured to emit light, the light being coherent;
   an optical modulation portion configured to modulate the light;
   a relay optical system configured to focus the light;
   a reflection mirror that is disposed at a focal position of the relay optical system and configured to reflect light incident through the relay optical system;
   a light absorption plate that is disposed at a rear side of the reflection mirror and configured to absorb light incident through the relay optical system; and
   a transflective mirror configured to partially transmit and partially reflect light reflected by the reflection mirror,
   wherein the light absorption plate overlaps the reflection mirror,
   an overlapping portion of the light absorption plate and the reflective mirror is smaller than the light absorption plate in any direction when viewed on a plane, and
   wherein the reflection mirror is configured to provide a convex reflective side that is bent with reference to a virtual central axis in one direction with respect to light incident from the optical modulation portion, and the absorption portion has a flat planar shape.

2. The holographic head-up display device of claim 1, wherein a size of a reflective side of the reflection mirror is the same as a size of a focal image formed at a focus point of the relay optical system.

3. The holographic head-up display device of claim 2, wherein a shape of the reflective side of the reflection minor is the same as a shape of the focal image, and the shape of the focal image is the same as a shape of a display area to which the optical modulation portion emits light.

4. The holographic head-up display device of claim 3, wherein the shape of the display area of the optical modulation portion and the shape of the reflective side of the reflection minor are a quadrangle.

5. The holographic head-up display device of claim 1, wherein the reflection minor is configured to provide a convex reflective side that is bent with reference to a virtual central axis in one direction with respect to light incident from the optical modulation portion.

6. A holographic head-up display device comprising:
   a light source portion configured to emit light, the light being coherent;
   an optical modulation portion configured to modulate the light;
   a relay optical system configured to focus the light;
   a reflection minor that is disposed at a focal position of the relay optical system and configured to reflect light incident through the relay optical system;
   a light absorption plate that is disposed at a rear side of the reflection minor and configured to absorb light incident through the relay optical system; and
   a transflective minor configured to partially transmit and partially reflect light reflected by the reflection minor,
   wherein the light absorption plate overlaps the reflection minor,
   an overlapping portion of the light absorption plate and the reflective minor is smaller than the light absorption plate in any direction when viewed on a plane, and
   wherein the reflection minor is configured to provide a convex hemispherical reflective side with respect to light incident from the optical modulation portion, and the absorption portion has a flat planar shape.

7. A holographic head-up display device comprising:
a relay optical system configured to focus incident light on a focus point; and
a filter mirror that includes a reflection portion configured to reflect a focal image formed at the focus point and an absorption portion configured to absorb diffraction noise formed at a periphery of the focal image,
wherein the reflection portion and the absorption portion are disposed on different planes of the filter mirror,
wherein the absorption portion is disposed at a rear side of the reflection portion and overlaps the reflection portion,
an overlapping portion of the light absorption plate and the reflective minor is smaller than the light absorption plate in any direction when viewed on a plane, and
wherein the reflection portion is configured to have a convex curved shape with respect to the incident light focused by the relay optical system, and the absorption portion has a flat planar shape.

\* \* \* \* \*